US006425968B1

(12) United States Patent
Eichlseder (10) Patent No.: US 6,425,968 B1
(45) Date of Patent: Jul. 30, 2002

(54) METHOD FOR BONDING TWO HALVES OF A DVD (DIGITAL VERSATILE DISC)

(75) Inventor: Martin Eichlseder, Tettenweis (DE)

(73) Assignee: Krauss-Maffei Kunstsofftechnik GmbH, München (DE)

( * ) Notice: Subject to any disclaimer, the term of this patent is extended or adjusted under 35 U.S.C. 154(b) by 0 days.

(21) Appl. No.: 09/498,503

(22) Filed: Feb. 4, 2000

Related U.S. Application Data (63) Continuation of application No. PCT/EP98/04913, filed on Aug. 6, 1998.
(60) Provisional application No. 60/062,423, filed on Oct. 15, 1997.

(30) Foreign Application Priority Data

Aug. 6, 1997  (DE) .......................... 197 34 056

(51) Int. Cl.[7] .............. B32B 31/00; G11B 7/26
(52) U.S. Cl. ............ 156/74; 156/275.5; 156/275.7; 156/578
(58) Field of Search ............ 156/74, 578, 275.5, 156/275.7, 295; G11B 7/26

(56) References Cited

U.S. PATENT DOCUMENTS 6,042,684 A * 3/2000 Ohman .................. 156/578 X

FOREIGN PATENT DOCUMENTS

| EP | 0 773 372 A | | 5/1997 |
| JP | 63-124247 A | * | 5/1988 |
| WO | WO 97 35720 A | | 10/1997 |
| WO | WO 97 36737 A | | 10/1997 |
| WO | WO 97 43760 A | | 11/1997 |

OTHER PUBLICATIONS

Patent Abstracts of Japan vol. 012, No. 380 (P–769), "Production of Optical Disc", Oct. 12, 1988 & JP 63 124247 A (Matsushita Electric Ind. Co. Ltd.), May 27, 1988.

* cited by examiner

Primary Examiner—Jeff H. Aftergut
(74) Attorney, Agent, or Firm—Henry M. Feiereisen (57) ABSTRACT

A method for bonding two DVD halves (23, 24) which are so held at a distance as to form a gap therebetween, includes introducing into the gap an adhesive (36) and spreading the adhesive across both disc halves. The invention is characterized by introducing the adhesive via a central opening of the DVD by means of e.g. L-shaped metering needles (63) which are pivotally guided in a central pin that engages the central opening, or flexible plastic needles which are slidably guided in a guide tube. Through introduction of the adhesive via the central opening enables a flow to the outside, without interference from the metering needles, when the DVD halves (23, 24) rotate. There is no buildup of adhesive in front of the metering needle. The bonding process can be carried out without interruption of the application of adhesive until the spin-off has concluded.

26 Claims, 9 Drawing Sheets

METHOD FOR BONDING TWO HALVES OF A DVD (DIGITAL VERSATILE DISC)

CROSS-REFERENCES TO RELATED APPLICATIONS

This application is a continuation of prior filed copending PCT International application no. PCT/EP98/04913, filed Aug. 6, 1998, which claims the priority of German Patent Application Serial No. 197 34 056.3, filed Aug. 6, 1997 and claims priority of prior filed copending provisional application Appl. No. 60/062,423, filed Oct. 15, 1997.

BACKGROUND OF THE INVENTION

The invention relates to a method and apparatus for bonding substantially rotationally symmetric discs, in particular discs made from polycarbonate, which have a center opening. The present invention is particularly useful for bonding two DVD halves; here, two halves of an information carrier, each half having a thickness of 0.6 mm, are to be bonded. The halves are held apart so that a gap is created between the discs; after the adhesive is injected into the gap, the two disc halves rotate such that the adhesive is spread across the two disc halves until the disc halves are completely covered with the adhesive. Certain problems occur in the bonding of various DVD variants with a diameter of 120 mm (a diameter of 80 mm is also feasible), such as DVD 5, 10, 9 and DVD 18 in DVD audio, DVD video, DVD-ROM, DVD-R and DVD-RAM configurations. These problems can be due to unevenness (radial tilt and tangential tilt) in the radial and tangential directions as well as to contamination during the bonding process, for example, if the adhesive layer is non-uniform or contains bubbles. Bubbles in the adhesive layer are extremely critical and cause the DVD to fail. This problem is exacerbated in the DVD 9, which stores information in two planes, wherein the second information plane is read out through the adhesive layer.

Several conventional methods are used to manufacture DVD's. In the so-called "hot melt" bonding process, the adhesive is hot and highly viscous and is applied to each DVD half with a roller. The two halves are subsequently superimposed and pressed together. Bubbles can form very easily with this process, causing flaws in the adhesive layer and making this method useless for the manufacture of a DVD 9. In the "UV screen print bonding" process, adhesive is applied to both halves (similar to hot melt bonding), and the halves are subsequently superimposed and pressed together. Unlike the "hot melt bonding" process, a screen print process is used herein to apply the adhesive. The "hot melt bonding" process, however, poses the same problems as the "hot melt bonding" process, i.e. the adhesive layer has flaws and bubbles are formed. Moreover, the unevenness of the disc (radial tilt, tangential tilt) can create problems. This process is described in a publication from the company EDME.

Another process is "UV capillary bonding" as described in a product brochure from the company Toolex Alpha. The two DVD halves are in this process held apart by vacuum discs and are simultaneously bent (FIGS. 4–5 in the brochure). The adhesive is injected through a dispenser needle which is inserted into the gap between the two DVD halves. The dispenser needle extends radially to about half the radius, at which location adhesive is furnished during a single revolution of the disc. The dispenser needle is then withdrawn from the gap and the vacuum is released. The "bent" DVD halves now return to their original parallel alignment and the adhesive is spread both inwardly and outwardly by capillary forces. This method has the disadvantage that cracks can develop in the sputtered metallic layers (which are used to reflect the laser light). The surfaces of the DVD halves are also susceptive to damage when the dispenser needle is inserted into the gap. Lastly, due the rotation of the DVD when the adhesive is applied, the centrifugal forces from the applied adhesive can press against the dispenser needle and cause "jamming" of the adhesive in front of the dispenser needle.

Most closely related to the present invention is the "UV spin coat bonding" process which is described in a product specification from the company Panasonic. In the "UV spin coat bonding" process, the two DVD halves are held parallel to each other with a gap therebetween. A strand of adhesive is applied through a dispenser needle which is inserted into the gap close to the center of the DVD. The strand of adhesive is applied close to the center during a single revolution of the disc. The dispenser needle is then withdrawn from the gap and the adhesive is spun off through rotation, thereby spreading over the two halves. With this process, the strand of adhesive supposedly adheres to both halves so that a relatively bubble-free adhesive layer is created when the adhesive is spun off. The process, however, has the drawback that the dispenser needle must be inserted close to the center. This can also result in damage to the DVD halves. The damage can be prevented by accurately supporting the two DVD halves and by precisely guiding the dispenser needle, which requires complex equipment. Moreover, when the strand of adhesive is applied and the adhesive emerges from the dispenser needles, the centrifugal force pushes the adhesive against the dispenser needle and disturbs the adhesive flow. The dispenser needle also has to be removed from the gap, before the adhesive is spread by rotating the disc, which requires an additional operational step.

SUMMARY OF THE INVENTION

It is thus an object of the present invention to provide an improved method for bonding two DVD halves, obviating the afore-stated drawbacks.

In particular, it is an object of the present invention to provide an improved method for reliably bonding, without forming bubbles, two DVD halves or other rotationally symmetric discs, in particular discs made from polycarbonate, which have a center opening.

The objects, and others which will become apparent hereinafter, are attained in accordance with one aspect of the present invention for bonding substantially rotationally symmetric plates, in particular plates based on polycarbonate, having a center opening, by introducing adhesive between the spaced-apart plates through the center opening and spreading the adhesive on the plates through rotation of the plates.

In accordance with another aspect of the present invention for bonding two DVD halves spaced from one another at formation of a gap between the halves, he method includes the steps of introducing adhesive in the gap through a center opening of the DVD; and spreading the adhesive across the two halves.

In accordance with the present invention, the adhesive is introduced through the center opening, and thus can advantageously flow unimpeded from the supply element, for example a metering needle, to the outside. The adhesive then does no longer accumulate in front of the metering needle, so that subsequent process steps can be initiated sooner. The adhesive bonding process can be carried out without interruption from the time the adhesive is injected until the spinning operation is completed.

According to another feature of the present invention, the metering needle is rigid and the end of the metering needle is bent about an angle of 90°, wherein the length of the bent section is smaller than the diameter of the opening. The metering needle may suitably enter the gap between the two DVD halves only along a short distance, so that the surfaces are almost never damaged. Through adjusting an appropriate wedge angle, the adhesive disposed in the wedge is spread uniformly and symmetrically, provided that the rotational speed is increased slightly (depending on the dynamic pressure in the gap) after application of the adhesive. Before the adhesive is actually spun off, each point of the half has the same initial condition so that the flow velocity of the leading edge is uniform in all directions. Consequently, the inclusion of bubbles by leading adhesive flow is eliminated. The exit opening of the dispenser needle can be designed so that the DVD halves are wetted simultaneously when the adhesive is injected.

It is another object of the invention to provide an apparatus for carrying out the method.

This object, and others which will become apparent hereinafter are attained in accordance with the present invention by providing a retention unit for holding and moving the plates relative to one another, a centering unit for centering the plates, and at least one fluid supply line which is guided from the outside through one of the central openings and terminates in the space between the spaced-apart plates.

BRIEF DESCRIPTION OF THE DRAWING

The above and other objects, features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Throughout all the Figures, same or corresponding elements are generally indicated by same reference numerals.

Figures 1, 2:
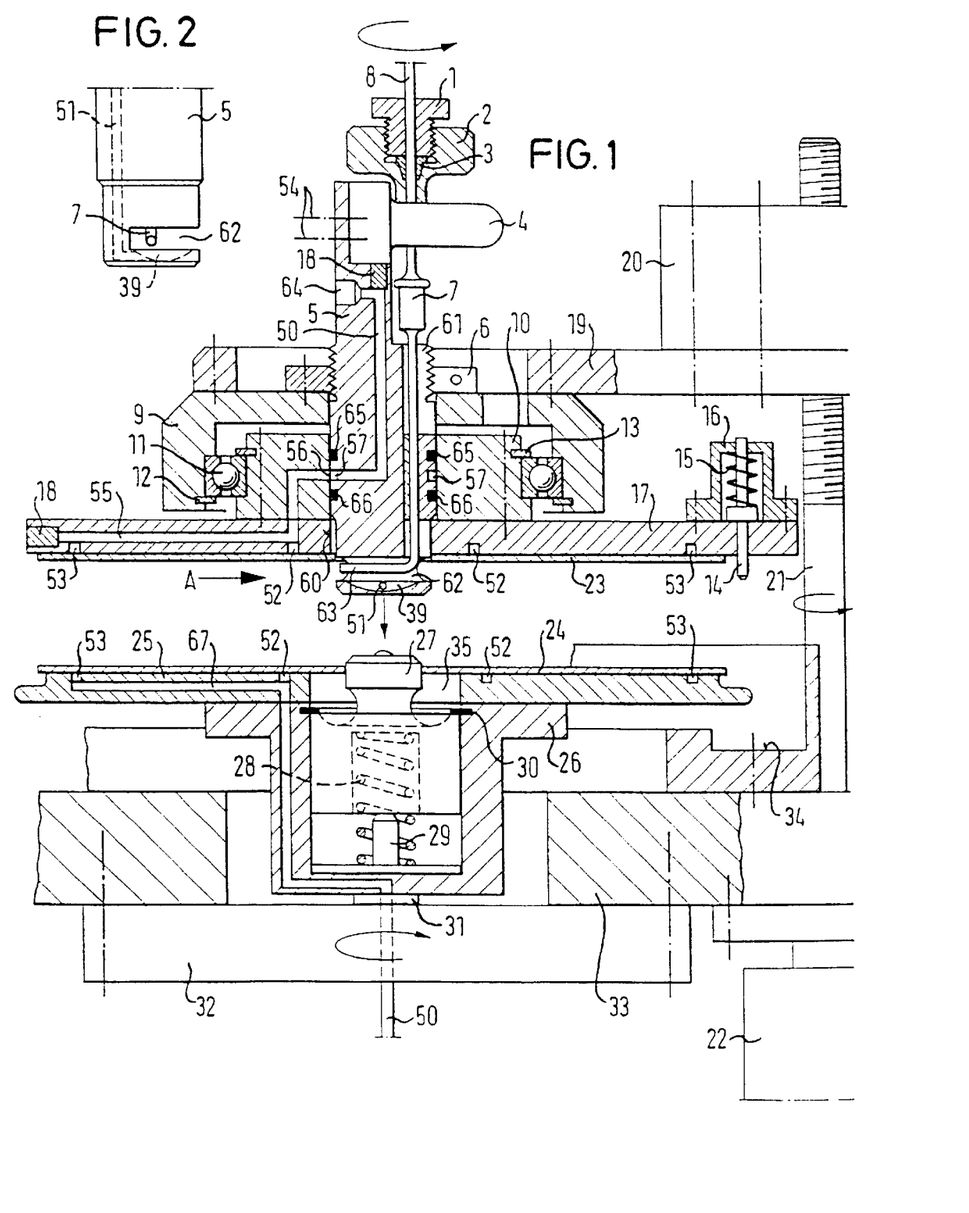
FIG. 1 is a first embodiment of a bonding station according to the invention.
FIG. 2 is a view in the direction of the arrow A of FIG. 1.

Turning now to the drawing, and in particular to FIG. 1, there is shown a first embodiment of a bonding station according to the invention. A base plate 33 supports a spindle 21 with a spindle drive 22 and a spindle housing 20, with a support bracket 19 attached to the spindle housing 20 perpendicularly to the spindle axis. A substantially cylindrical bearing housing 9 is attached on the outer marginal region of the support bracket 19. A ball bearing 11 is inserted in the bottom marginal region of the bearing housing 9. The ball bearing 11 supports a bearing block 10 formed as a hollow cylinder, with the upper vacuum disc 17 secured to the underside of the bearing block 10. The vacuum disc 17 is thereby rotatably supported with respect to the bearing housing 9 and the support bracket 19. An inner circumferential vacuum groove 52 and an outer circumferential vacuum groove 53, which is connected to a vacuum channel 55, are disposed on the underside of the vacuum disc 17. The vacuum channel 55 extends inside the upper vacuum disc 17 in a radial direction and continues through the hollow cylindrical bearing block 10 inwardly towards the cylinder axis to an outlet 56. Since the vacuum channel 55 is produced by a bore which begins at the marginal edge of the vacuum disc, a plug 18 is placed at this location. A driving pin 14 is provided on the outer edge of the upper vacuum disc 17, outside the region taken out by the upper DVD half 23. The driving pin 14 is resiliently supported by a spring 15 in a spring cage 16, so that a friction connection between the two vacuum discs can be established when the upper and the lower vacuum disc 17, 25 move towards each other. The outer edge of the lower vacuum disc 25 is preferably provided with U-shaped recesses similar to a toothed gear which serve as engagement grooves adapted to engage the driving pin 14 when the vacuum discs 17, 25 move towards each other. An upper centering pin 5 extends from the top through the support bracket 19, the bearing housing 9, the hollow cylindrical bearing block 10 and the center opening 60 in the upper vacuum disc and continues into the space between the two DVD halves 23 and 24. The centering pin 5 it is secured to the bearing housing 9 and thereby also to the support bracket with a locking nut 6. A vacuum channel 50 extends inside of the upper centering pin 5, wherein the vacuum channel 50 is guided radially outwardly at the height of the outlet 56 of the bearing block 10 and terminates in a circumferential annular groove 57 matching up with the outlet 56. Sealing elements 65 and 66 providing a vacuum-tight seal between the centering hop 5 and the bearing block 10 are disposed above and below the annular groove 57. The centering pin 5 also has a channel 51 for suctioning off the adhesive, with the channel extending from the lower disc-shaped end to the upper region of the centering pin 5 (see FIG. 2) where the channel is connected to a suction device (not shown). A recess 61 extending parallel to the axis of the channel 51 is disposed in the surface of the centering pin 5. An L-shaped metering needle 7, preferably a steel needle, is placed in the recess 61, wherein the foot of the L, i.e., the end portion 63 of the metering needle 7 extending parallel to the DVD halves, is located in a U-shaped recess 62 at the lower end of the centering pin 5 (see detailed view in FIG. 2). An adhesive catch plate 39, which is continuously suctioned off through the suction channel 51 connected to a vacuum, is placed below the end portion 63 of the metering needle 7, thereby preventing the bonding station from being contaminated with drops of adhesive. The metering needle 7 is provided with adhesive via the metering line 8. The metering line 8 with the metering needle 7 can be attached at a desired height with a locking screw 1, a locking not 2 and a cutting ring 3. The metering needle 7 can be rotated about its axis with a rotating cylinder (gudgeon) 4 which is attached to the centering pin 5 and actuatable by compressed air 54, so that the bent end portion 63 of the metering needle 7 can be rotated in the space between that DVD halves 23, 24. A vacuum pump to be connected to the fitting 64 of the vacuum channel 50 is not shown. Since the vacuum channel 50 is produced in the same manner as the vacuum channel 55, a plug 18 is also required for sealing the front end of the bore hole.

Spaced apart below the upper DVD half 23 is a lower vacuum disc 25 having a center opening 35 as well as an inner vacuum groove 52 and an outer vacuum groove 53 which are connected to a vacuum pump through vacuum channels (67, 50). The vacuum disc 25 is attached to the housing 26—which has the form of a cylinder with a top—of the lower centering pin 27, which housing is located on the drive shaft 31 of the disc drive 32 which is preferably secured to the base plate 33. The lower centering pin 27 is supported in the centering pin housing 26 through a spring washer 30 and a spring 28 and is stabilized in its axial orientation by a guide pin 29. A channel 34 for catching excess adhesive is located below the outer edge of the lower vacuum disc 25.

Figure 3:
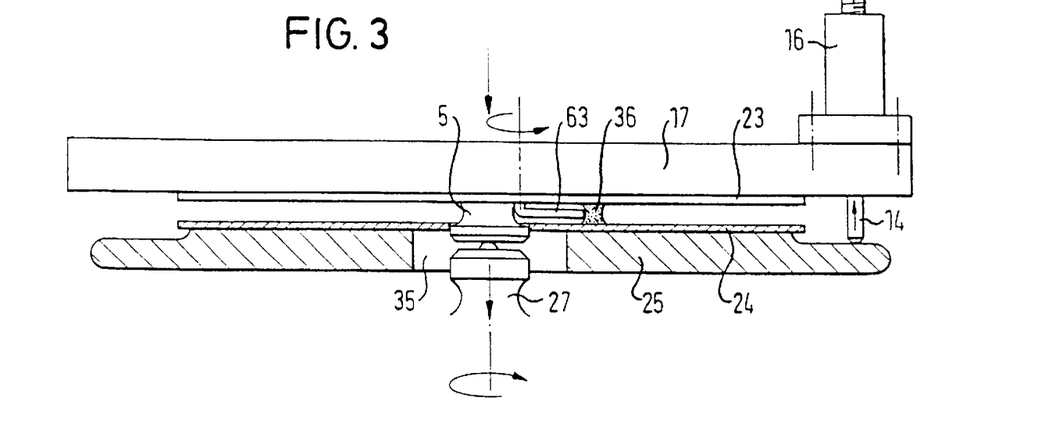
FIGS. 3 to 7 illustrate process steps for bonding the DVD halves in accordance with the invention.
Figure 4:
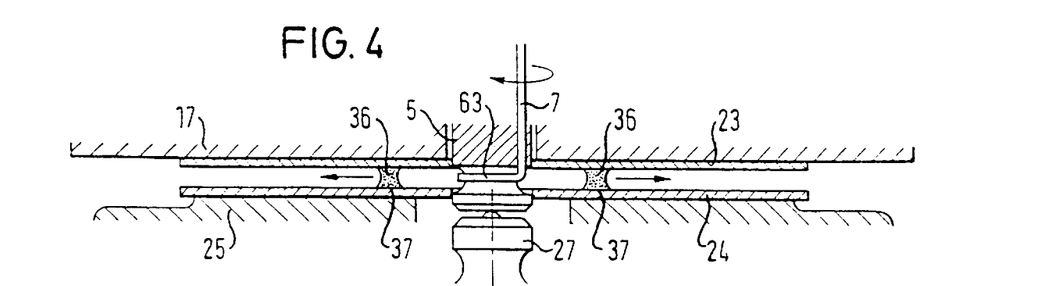
Figure 5:
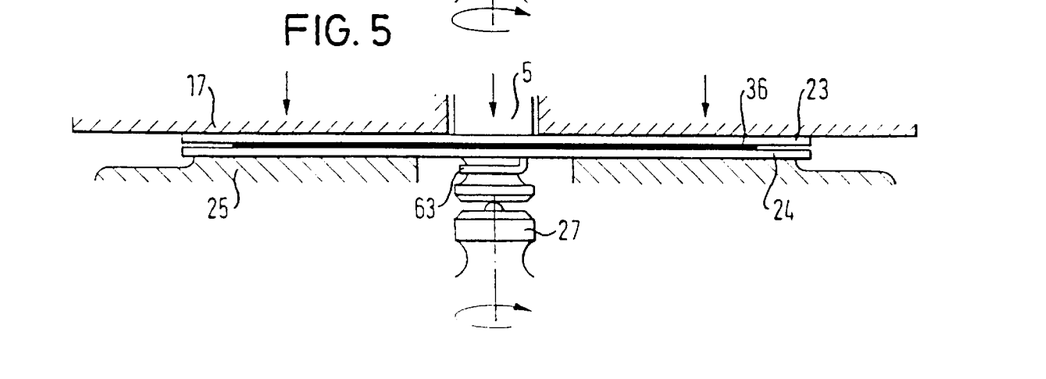
Figure 6:
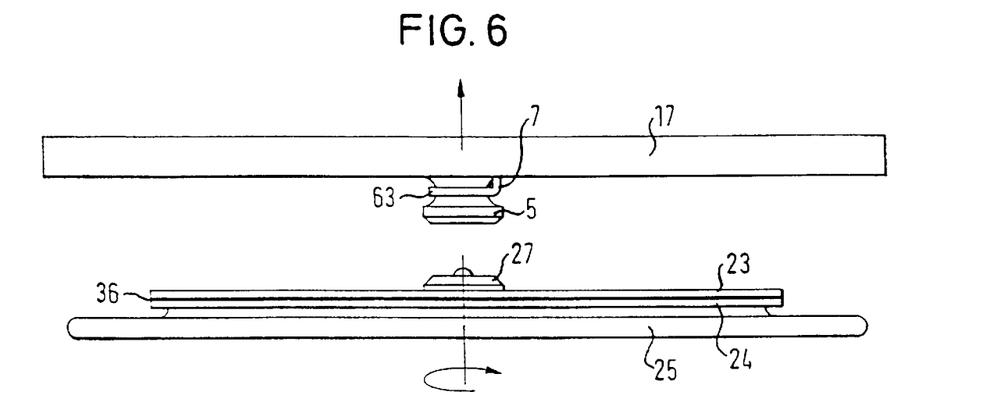
Figure 7:
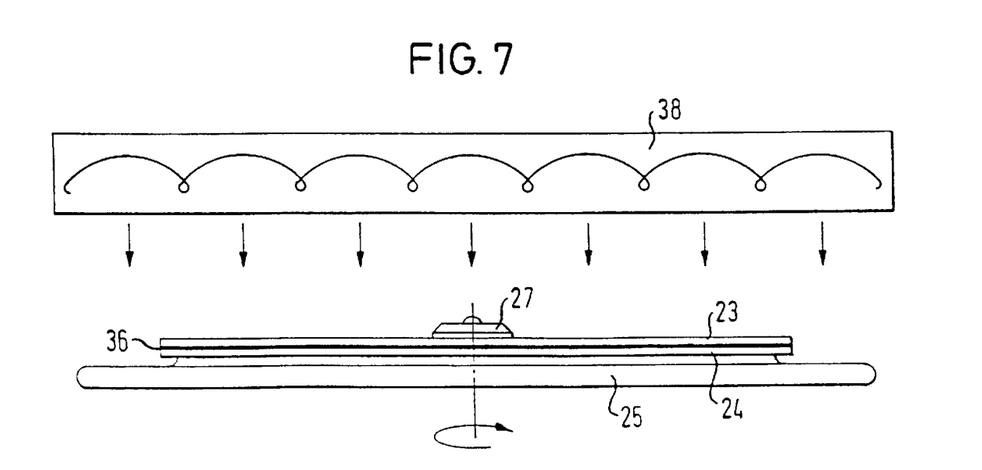

The DVD halves 23 and 24 are bonded by the following process. First, the two DVD halves 23 and 24 are inserted in the bonding station by a handling system, wherein one (the upper) DVD half 23 is conveyed to the upper vacuum disc 17 and the other (lower) DVD half 24 is conveyed to the lower vacuum disc 25. The two DVD halves 23, 24 are centered by the centering pins 5 and 27 via the center opening and held against the vacuum discs 17, 25 by a vacuum produced in the vacuum grooves 52 and 53 (FIG. 1). Alternatively or in addition, the upper DVD half 23 can also be centered making use of the outside diameter, for which purpose the upper vacuum disc 17 has a recess for receiving the upper DVD half 23, with the diameter of the recess corresponding to the diameter of the DVD and the depth of the recess corresponding to the thickness of the DVD half 23. Thereafter, the lower centering pin housing 26 with the lower vacuum disc 25 is set in rotation by the disc drive 32 via the drive shaft 31. The rotation speed is adjusted as required by the application of the adhesive (approximately 6000°/min to 36,000°/min). The upper vacuum disc 17 with the upper DVD half 23 which is connected to the support bracket 19, is then moved downwardly to the desired position by a spindle 21 and the associated spindle drive 22 (FIG. 3), in which position the DVD halves 23 and 24 have the required mutual separation for optimally applying the adhesive (approximately 1–2 mm). In this downward motion, the upper centering pin 5 penetrates the lower DVD half 24 and thereby pushes the lower resilient centering pin 27 backward. Moreover, the resilient outer driving pin 14 is urged against the lower vacuum disc 25 and engages with the next arriving engagement groove. The end portion 63 of the metering needle 7 is simultaneously rotated from the center of the DVD by 180° by the rotary cylinder 4, thereby moving the end portion 63 into the position for applying the adhesive (adhesive application position) between the two DVD halves 23 and 24. The application angle can be adjusted by rotating the end portion 63 of the metering needle 7 by an angle <180°. Since the lower vacuum disc 25 already rotates with the proper speed for applying the adhesive, the upper vacuum disc 17 is also set in rotation by the driving pin 14 with the same rotation speed, so that the upper vacuum disc 17 rotates synchronously with the lower vacuum disc 25. The metering process is started as soon as the metering needle 70 or its end portion 63, respectively, are in the adhesive application position and adhesive 36 is supplied between the DVD halves 23 and 24. The adhesive 36 is metered by volume, whereby the exact required amount is applied during approximately one revolution. The two DVD halves 23 and 24 are wetted simultaneously when the adhesive 36 is applied. After the adhesive has been supplied and a closed strand 37 of adhesive is present, the metering needle 70 or its end portion 63 are immediately rotated backwardly by 180° into the rest position (FIG. 4). The rotation speed of the disc drive is simultaneously increased (to approximately 100,000°/min to 200,000°/min) and the adhesive 37 is spun off outwardly. At the same time, the rotation speed is increased, the upper vacuum disc 17 is moved farther downwardly by the spindle drive 22 and the two DVD halves are pressed together (FIG. 5). The adhesive is thereby distributed over most of the DVD surface area. The simultaneous pressing and spinning operation supports the capillary action, thereby accelerating the spreading of the adhesive 36. When a predetermined minimal separation between the two vacuum discs 17, 25 is reached, the vacuum is disconnected from the upper vacuum disc 17 and the upper disc is moved upwardly by the spindle drive 22 (FIG. 6). The upper DVD half 23 remains on the lower DVD half 24. At the same time, the lower centering pin 27 is pushed outwardly by the spring 28 and now centers both DVD halves 23, 24. Alternatively, the vacuum on the upper vacuum disc 17 can already be disconnected when the two DVD halves are pressed together. For distributing the adhesive uniformly to the outer edge of the DVD, the spin rotation speed is increased further (to approximately 500,000°/min to 900,000°/min). After the adhesive 36 has been spread, the DVD is cycled under the UV lamp 38 where the adhesive 36 is hardened (FIG. 7). After the adhesive has completely hardened, the DVD is removed by a handling system and conveyed to a tester which checks the DVD with a laser scanner for optical and dimensional errors.

Figure 8:
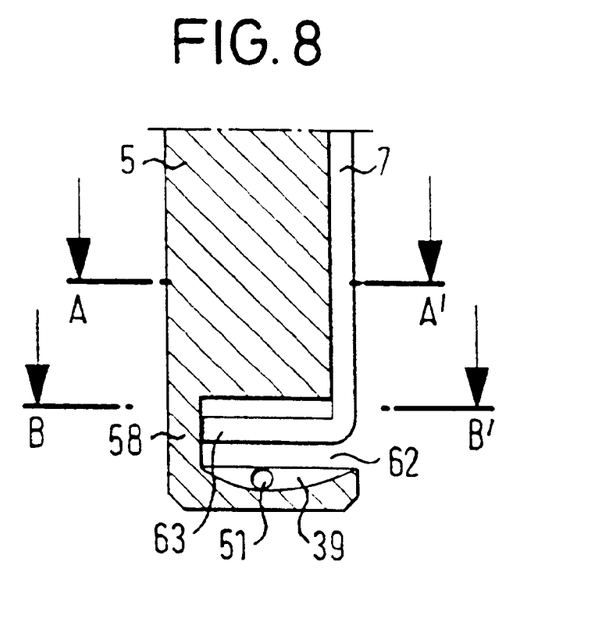
FIG. 8 shows an alternate embodiment of the upper centering pin.
Figure 9:
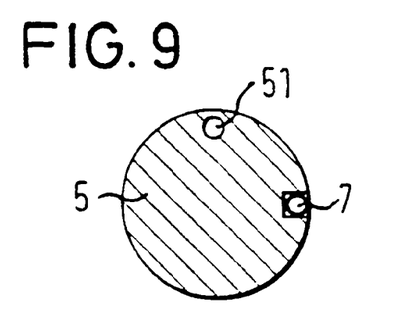
FIG. 9 is a section at the height AA' through the centering pin of FIG. 8.
Figure 10:
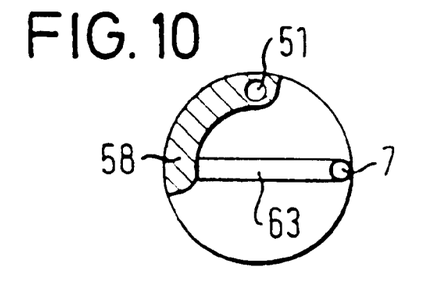
FIG. 10 is a section at the height BB' through the centering pin of FIG. 8.

FIGS. 8 to 10 depict an alternative embodiment of the upper centering pin 5 shown in FIGS. 1 and 2. Unlike the centering pin 5 of FIGS. 1 and 2, a web 58 is provided opposite the discharge opening of the end portion 63 of the metering needle 7 (in the rest position), wherein the end portion 63 is moved against the inside of the web when the metering needle 7 is rotated back into the rest position, so that the opening of the end portion 63 is closed and excess adhesive is prevented from reaching the bonding station. The adhesive catch plate 39 and the adhesive suction channel 51 can be kept as an additional safety measure.

Figure 11:
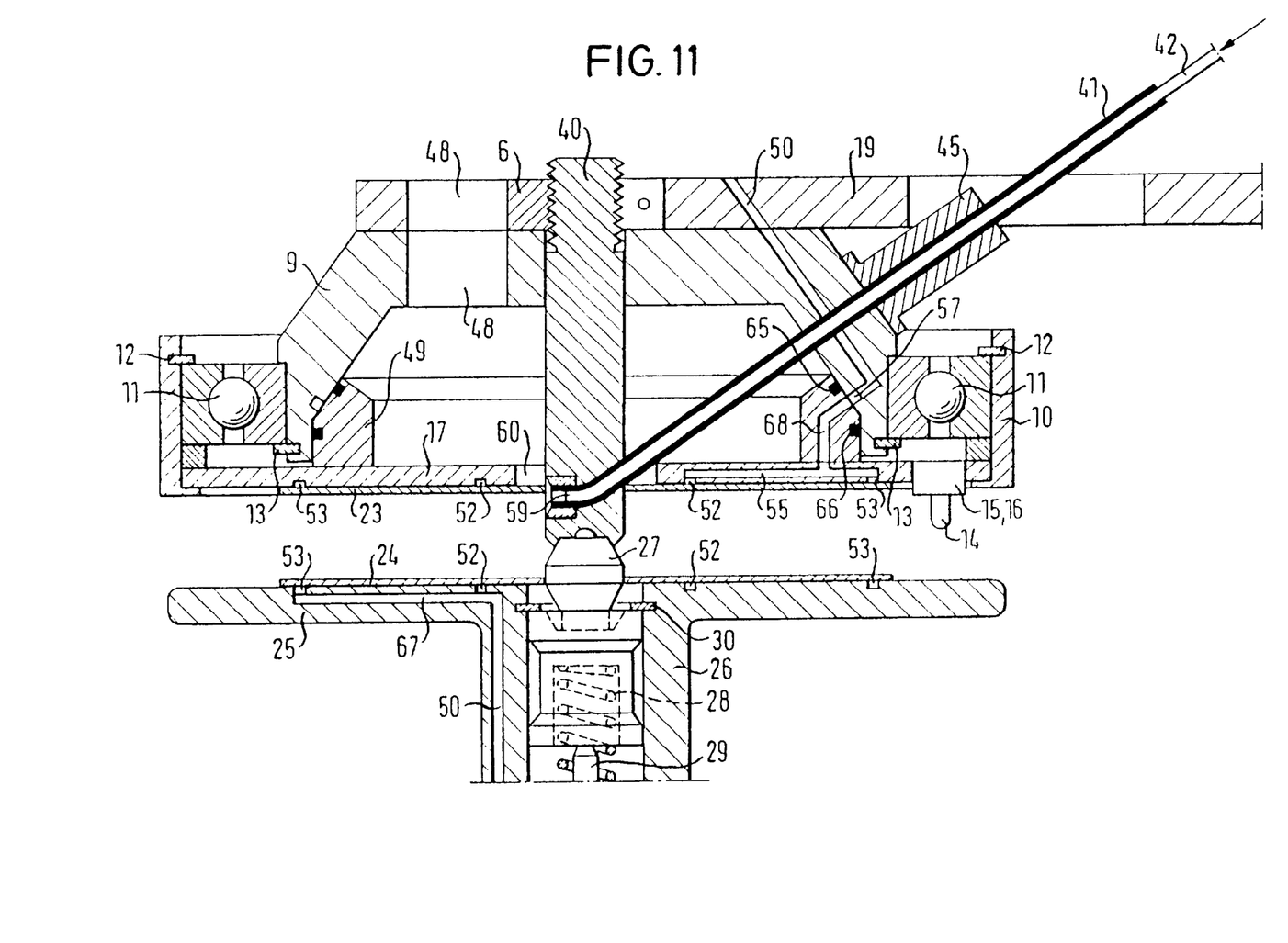
FIG. 11 is a representation of a second embodiment of a bonding station according to the invention.
Figure 12:
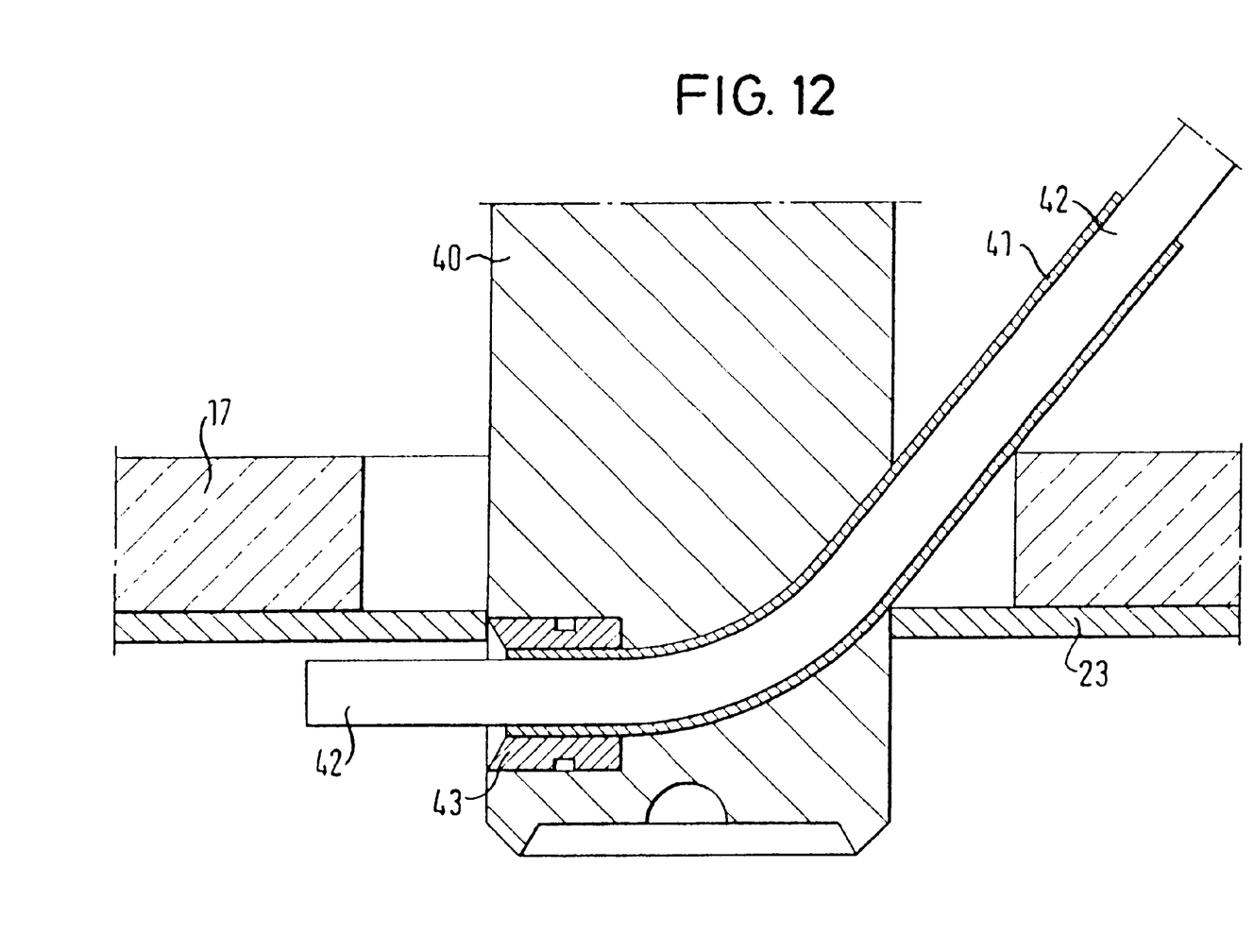
FIG. 12 is a cutaway view, on an enlarged scale, of the bonding station of FIG. 11.

FIGS. 11 and 12 show a second embodiment of a bonding station according to the invention with a metering needle that can be moved in an axial direction. The lower section with the lower vacuum disc 25, the centering pin housing 26, the centering pin 27, the spring 28, the guide pin 29, the spring washer 30, the inner vacuum groove 52, the outer vacuum groove 53 as well as the vacuum channels 67 and 50 are identical to the corresponding lower section of FIG. 1. As in the first embodiment, a driving pin 14 is also resiliently supported (15, 16) on the outer marginal edge of the upper vacuum disc 17 and is adapted to engage in engagement grooves disposed on the edge of the lower vacuum disc 25. In the upper section of the bonding station, a bearing housing 9 is attached to the support bracket 19, which is connected to the spindle 21 (not shown), in the marginal region of the support bracket 19. A ball bearing 11 is disposed on the outer circumference in the lower section of the bearing housing 9 and secured with an inner spring ring 13. The ball bearing 11 supports a bearing block 10 (secured with an outer spring ring 12). The upper vacuum disc 17 is inserted and secured in the lower edge of the bearing block 10, for example with a suitable adhesive. For observing the bonding operation of the two DVD halves 23 and 24 and to optimize the process based on the results, the upper vacuum disc is made of glass while the support bracket 19 and the bearing housing 9 are provided with openings 48 through which the glass vacuum disc 17 (and the processes occurring underneath the vacuum disc) can be observed. An annular member 49 having a vacuum channel connected to the vacuum channel 55 in the upper vacuum disc 17 as well as to the vacuum channel 50 extending through the bearing housing 9 and the support bracket 19, is glued to the upper vacuum disc 17. Two glass discs, with one of the glass discs provided with a groove, can be glued together to provide the vacuum channel 55 in the glass vacuum disc 17. An annular groove 57 can extend on one of the opposing surfaces at the interface between the annular member 49 and the bearing housing 9 to maintain the vacuum during rotation. Sealing elements 65 and 66 are provided above and below the annular groove 57 to maintain the vacuum. The vacuum channel 50 is connected to a vacuum pump in a known manner. An upper centering pin 40 extends from above through the support bracket 19, the bearing housing 9, the annular member 39 and the central opening 60 in the upper vacuum disc 17 and continues into the space between the two DVD halves 23 and 24. The vertical position of the centering pin 40 can be adjusted with a locking nut 6. A guide tube 41 is guided at an angle through corresponding openings disposed in the support bracket 19 and the bearing housing 9, then enters the centering pin 40 in the upper region of the centering pin 40 where it transitions into a horizontal orientation, so that the end portion 59 of the guide tube 41 extends parallel to the DVD halves 23, 24. In this region, the centering pin is provided with a removable section corresponding to a longitudinal half section which in conjunction with the other half section forms a complete cylinder in this region. Each longitudinal half section has a groove, thereby forming—when the longitudinal half sections are joined—a curved bore in which the guide tube 41 is placed. A bushing 43 which secures the position of the end of the guide tube 41, is provided at the exit opening of the centering pin 40. An elastic plastic needle 42 disposed inside the guide tube 41 forms the metering needle 7. For applying the adhesive, the elastic metering needle 7 can be displaced from the guide tube 41 by a predeterminable distance in the space between the two DVD halves 23 and 24 with the help of an air cylinder 45 attached to the bearing housing 9 (see detailed view in FIG. 12).

The method for bonding the DVD halves 23 and 24 is substantially identical to the method described above with reference to FIG. 1 and FIGS. 2–7. The only difference to the aforedescribed embodiment is that the metering needle 7 is not rotated into the adhesive application station and then rotated back into the rest position, but is pushed out of the guide tube 41 into the adhesive application position and is completely retracted into the guide tube 41 (rest position) after the adhesive has been applied.

Figure 13:
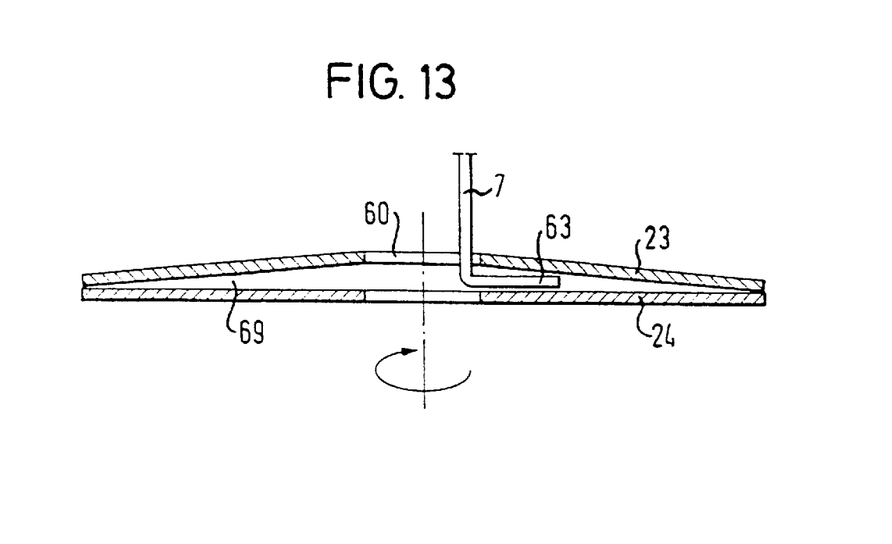
FIG. 13 is an illustration of central-bonding with a symmetric wedge-shaped gap.
Figure 14:
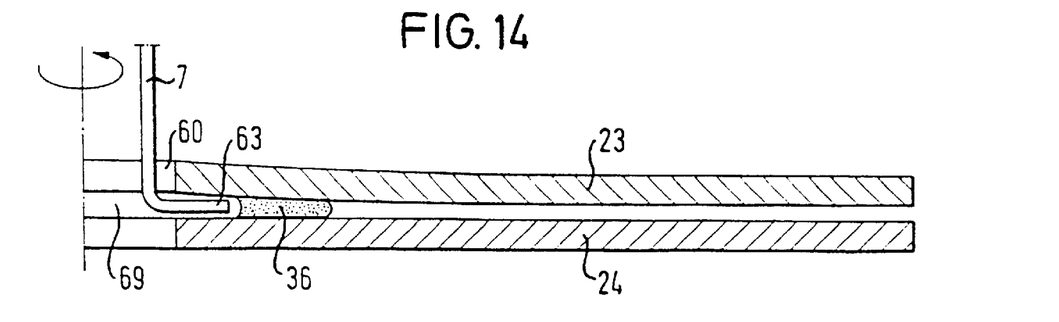
FIG. 14 is an illustration of central-bonding with an asymmetric wedge-shaped gap.

FIGS. 13 and 14 show schematically additional embodiments of the Central Bonding process according to the invention. The DVD halves 23 and 24 are held on two mould discs at a desired spacing by vacuum in a manner known in the art. FIG. 13 shows the lower DVD half 24 in a horizontal position, whereas the upper DVD half 23 is held at an angle, thereby producing a gap 69 which is tapered towards the outer edge. An L-shaped metering needle 7 moves across the center opening of the DVD and downwardly into the wedge-shaped gap, whereafter the needle moves from the center outwardly between the two DVD halves 23, 24. In this case, the bent portion of the metering needle has to be smaller than the diameter of the opening. The metering needle can be guided—similar to FIG. 1—in an opening of the upper centering pin. The metering needle meters the required quantity of adhesive in the form of an adhesive strand while simultaneously rotating the DVD into the wedge-shaped gap 69. Alternatively, the metering needle may be rotated while their DVD is stationary. Both halves of the DVD are wetted by the adhesive due to the wedge shape of the gap. By continuing to rotate the DVD, preferably at a slightly higher rotation speed, the adhesive disposed in the wedge is pushed outwardly by the centrifugal force and assumes a symmetric shape. By adjusting the wedge angle as a function of the rotation speed of the DVD, the adhesive can be prevented from being spun off in spite of the rotation of the DVD, because the dynamic pressure is greater than the centrifugal force of the adhesive, so that a symmetric bubble-free adhesive ring can be formed in the wedge. Advantageously, as illustrated in FIG. 14, the wedge may be narrowed in the region where the adhesive is applied, so that the DVD halves almost contact each other proximate to the end of the metering needle. This arrangement eliminates or reduces the capillary forces which draw the adhesive off already at the time of application. The wedge shape advantageously also provides an excess quantity of adhesive towards the inside, so that only a small amount of residual adhesive has to be pushed outwardly in front of the adhesive front through the narrow gap during the spinning operation. The optimal outer diameter for the adhesive can be adjusted before the spinning operation by the adjusting the width of the wedge-shaped gap. The adhesive is spun off already during application of the adhesive, continuing uninterruptedly to the end, which reduces the total cycle time of a bonding process. Moreover, the metering needle can be returned early to its rest position. By increasing the rotation speed at the same time the vacuum is released, the adhesive is uniformly distributed from the inside to the outside (spin-off), whereby excess adhesive is spun off to the outside beyond the marginal region. In the different phases of the bonding process (application of the adhesive, symmetric distribution of the adhesive, spin-off), the gap can be made into different shapes using suitable vacuum discs, so that the gap can be optimally set according to the viscosity of the adhesive. Dishing (flatness of the upper disc) is measured already during the spinning operation using laser optics, and the spinning operation is terminated when an optimal flatness is attained. The completed DVD is then handed over to the UV station and hardened from one slide or from both sides using UV light. Hardening from both sides is advantageous since uniform heating of the DVD is desirable. Thereafter, both sides are symmetrically cooled in a cooling station. In a final operation, a laser scanner checks the finished a DVD's for errors before the DVD's are placed on a spindle for quality-checked and approved parts.

Figure 15:
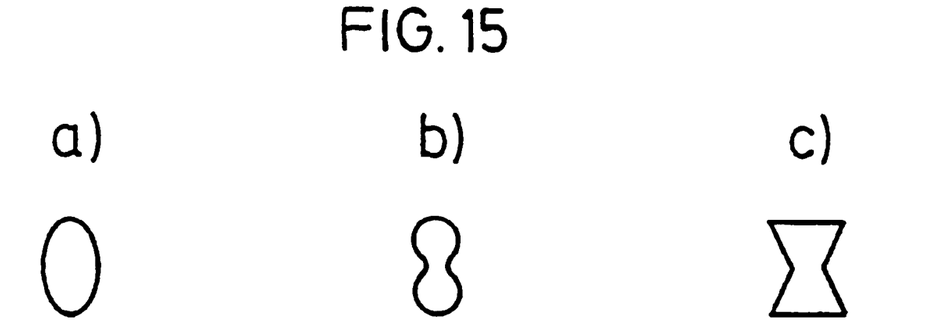
FIGS. 15a to 15c are cross sectional views of different exit openings of the metering needle.

FIG. 15 shows different exit openings of the metering needle 7 in cross-section, namely oval (a), rounded with neckings on the left and right side (b), and cornered with neckings on the left and right side (c). Those skilled in the art will appreciate that other geometries can be used. The shape most suitable for an application will depend on several factors, such as the viscosity of the adhesive and the settings when the adhesive is applied, and can be selected by those skilled in the art.

Figure 16:
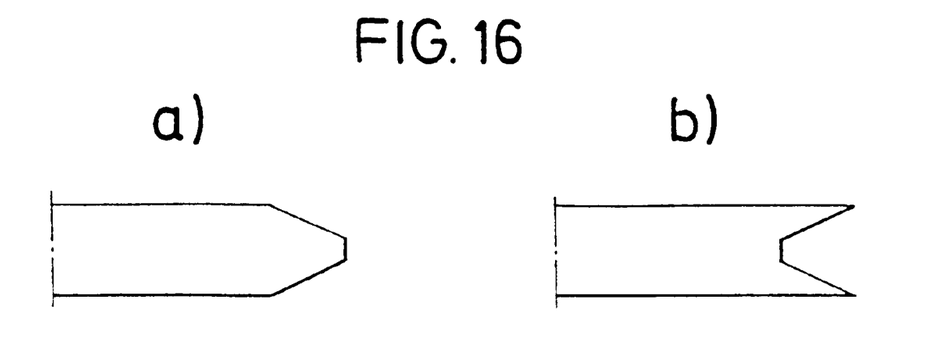
FIGS. 16a and 16b are side and top views of exit openings of different length top and bottom.

The end of the metering needle—as viewed along the circumference—in the region where the adhesive exits can have different lengths. FIG. 16 illustrates an embodiment, where the lateral regions of the metering needle project forwardly (a), whereas the upper and lower sides of see metering needle have rearwardly extending cutouts (b). The adhesive first exits near the cutouts and wets the DVD halves simultaneously. The present invention significantly improves the application of the adhesive. The small quantity of residual air disposed between the DVD halves is pushed out by the comparably symmetric initial form of the adhesive, without the adhesive moving faster on one side and including air bubbles, since the symmetric initial form of the adhesive causes the flow velocity of the adhesive front to be uniform. Accordingly, when the quantity of adhesive is accurately metered, only the actually required quantity of adhesive advantageously has to be applied, which in turn reduces the spin-off time and thereby also the cycle time.

Figure 17:
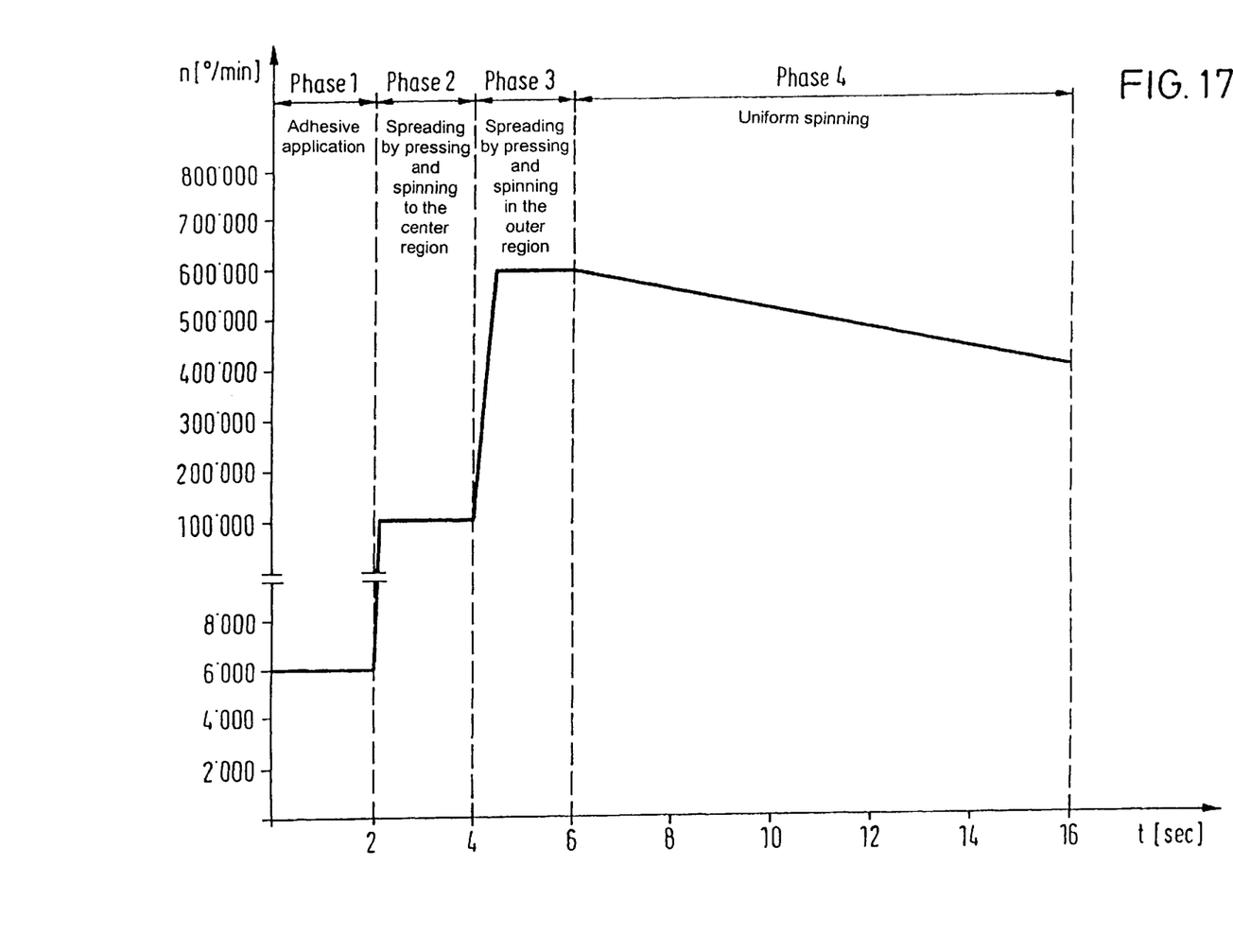
FIG. 17 is a graphical illustration, showing the rotation speed as a function of time during the bonding process.

An overview of essential technical parameters is provided in FIG. 17, without limiting the scope of the invention:

Phase 1: Rotation speed during application 6000°/min to 36,000°/min; First acceleration with approximately 10,000°/sec$^2$;

Phase 2: Spinning RPM during pressing up to approximately 200,000°/min; Second acceleration with approximately 10,000°/sec2;

Phase 3: Spinning RPM for uniform adhesive thickness up to approximately 900,000°/min, followed by a time of uniform spinning (Phase 4);

Deceleration to a rotation speed 0 with approximately 10,000°/sec$^2$ (not shown);

Maximal rotation speed 1.44 million°/min;

Maximal acceleration/deceleration 30,000°/sec$^2$.

The method is carried out without interruption of the disc speed. At the beginning of the application of the adhesive, the disc speed can be adapted to the process over 10 steps in accordance with the viscosity of the adhesive.

Metering time 1–2 sec;

Metering quantity 600 μliters;

Pressing time 1–2 sec;

Spin rotation speed 5–15 sec.

While the invention has been illustrated and described as embodied in a method for bonding two halves of a DVD (digital versatile disc), it is not intended to be limited to the details shown since various modifications and structural changes may be made without departing in any way from the spirit of the present invention.

LIST OF REFERENCE NUMERALS 1 locking screw
2 locking nut
3 cutting ring
4 rotary cylinder (gudgeon)
5 centering pin upper
6 locking nut
7 metering needle
8 metering line
9 bearing housing
10 bearing block
11 bearing
12 spring ring outer
13 spring ring inner
14 driving pin
15 spring cage
17 vacuum disc upper
18 plug
19 support bracket
20 spindle housing
21 spindle
22 spindle drive
23 DVD half upper
24 DVD half lower
25 vacuum disc lower
26 centering pin housing
27 centering pin
28 spring
29 guide pin
30 spring washer
31 drive shaft for disc drive
32 disc drive
33 base plate
34 adhesive catch ring
35 Central recess in the lower vacuum disc
36 adhesive
37 adhesive strand
38 UV lamp
39 adhesive catch plate
40 centering pin
41 guide tube
42 flexible metering needle
43 needle guide bushing
44 adapter
45 air cylinder for metering needle stroke
46 air cylinder holder
47 magnets
48 recesses
49 annular member
50 vacuum channel
51 adhesive suction channel
52 vacuum groove inner
53 vacuum groove outer
54 air connection for rotating cylinder
55 vacuum channel in the upper disc and bearing block
56 exit location of the vacuum channel 55 in the bearing block 10
57 annular groove
58 web
59 parallel end portion of the guide tube 41
60 center opening in the upper vacuum disc
61 groove or recess in the centering pin 5 parallel to the axis
62 U-shaped recess on the lower end of the centering pin 5
63 end portion of the metering needle

What is claimed is:

1. A method for bonding substantially rotationally symmetric plates having a center opening, said method comprising the steps of: supplying an adhesive between spaced-apart plates by means of a metering needle, wherein an end portion of the metering needle extends into the center opening, with the end portion being smaller than a diameter of the center opening and bent about an angle so as to be substantially parallel to the spaced-apart plates; and spreading the adhesive on the plates through rotation of the plates.

2. The method of claim 1, wherein the end portion of the metering needle has a length less than a diameter of the center opening.

3. The method of claim 2, wherein during application of the adhesive the two halves are stationary and the metering needle rotates.

4. The method of claim 2, wherein during application of the adhesive the two halves rotate and the metering needle also rotates or is stationary.

5. The method of claim 1, wherein the metering needle is rigid and the angle is 90°.

6. The method of claim 5, wherein the bent end of the metering needle is rotated from a rest position in the center opening of the plates to an adhesive application position between the plates.

7. The method of claim 6, wherein the bent end of the metering needle is rotated about an angle which is less than or equal to 180°.

8. The method of claim 1, wherein the metering needle is flexible and is movably supported in a guide bushing which is bent about the angle and disposed in the center opening.

9. The method of claim 8, wherein for application of the adhesive the metering needle is withdrawn from the guide bushing by a predeterminable distance and completely retracted into the guide bushing immediately after conclusion of the adhesive application.

10. The method of claim 1, wherein the plates are made of polycarbonate.

11. The method of claim 1, wherein the angle is greater than or equal to 90°.

12. A method for bonding two DVD halves spaced from one another at formation of a gap between the DVD halves, comprising the steps of supplying an adhesive in the gap by means of a metering needle, wherein an end portion of the metering needle extends into a center opening of the DVD halves, with the end portion being smaller than a diameter of the center opening and bent about an angle so as to be substantially parallel to the spaced-apart plates; and spreading the adhesive across the two DVD halves.

13. The method of claim 12, wherein the adhesive is spread by at least one process selected from the group consisting of spinning and pressing the DVD halves together.

14. The method of claim 12, wherein the end portion of the metering needle has a length less than a diameter of the center opening.

15. The method of claim 14, wherein the metering needle is rigid and the angle is 90°.

16. The method of claim 15, wherein the bent end of the metering needle is rotated from a rest position in the center opening of the DVD to an adhesive application position between the DVD halves.

17. The method of claim 16, wherein the bent end of the metering needle is rotated about an angle which is less than or equal to 180°.

18. The method of claim 14, wherein during application of the adhesive the two halves are stationary and the metering needle rotates.

19. The method of claim 14, wherein during application of the adhesive the two halves rotate and the metering needle also rotates or is stationary.

20. The method of claim 12, wherein the metering needle is flexible and is movably supported in a guide bushing which is bent about the angle and disposed in the center opening.

21. The method of claim 20, wherein for application of the adhesive the metering needle is withdrawn from the guide bushing by a predeterminable distance and completely retracted into the guide bushing immediately after conclusion of the adhesive application.

22. The method of claim 12, wherein the two DVD halves rotate continuously from the start of the adhesive application until the adhesive is completely spread, and wherein after the adhesive has been applied the rotation speed is increased to the desired spin-off speed.

23. The method of claim 12, wherein the gap in a region of the center opening is wedge-shaped, and wherein the wedge is tapered in the radial direction and adjusted in such a way that after application of the adhesive and before spin-off at a predetermined rotational speed, a dynamic pressure of the gap is larger than a centrifugal force acting on the adhesive, so that the adhesive is distributed uniformly and symmetrically in the wedge before being spun-off.

24. The method of claim 12, wherein the two halves-are wetted simultaneously when the adhesive is applied.

25. The method of claim 12, wherein, when the adhesive is applied and/or the adhesive is spread and/or the adhesive is spun off, the gap has a parallel or a wedge-shaped geometric shape.

26. The method of claim 12, wherein the angle is greater than or equal to 90°.

* * * * *